Patented Mar. 27, 1934

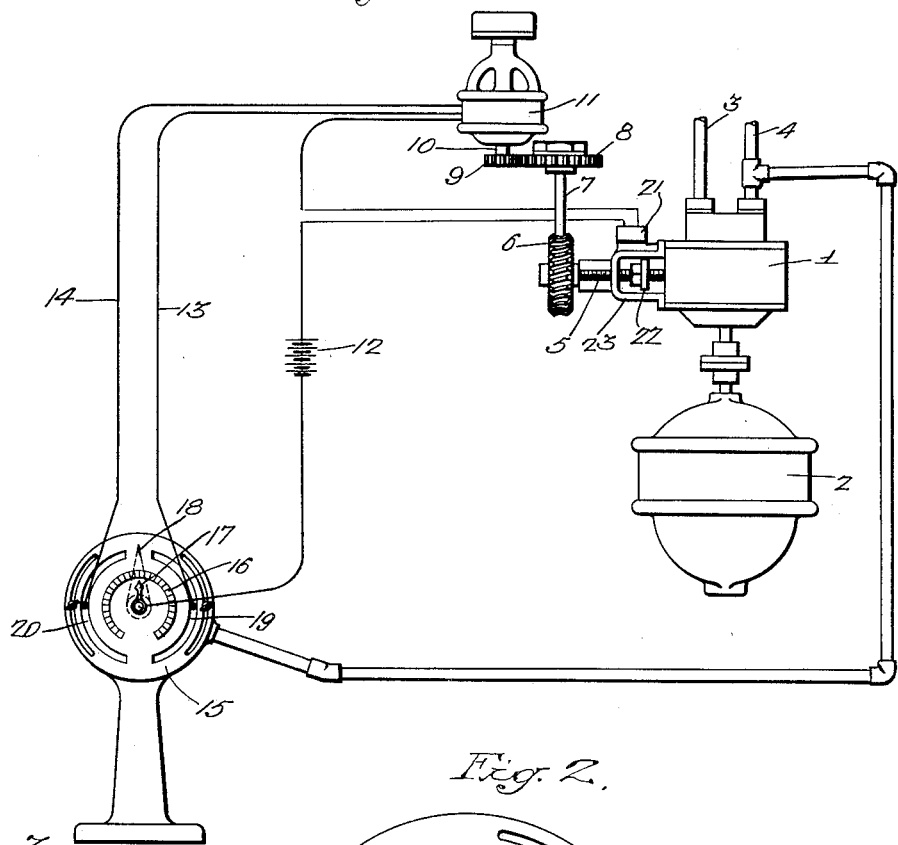
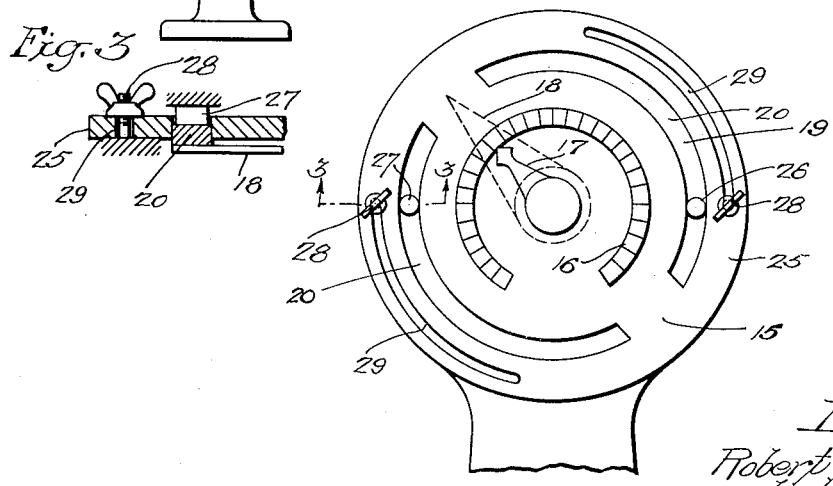

1,952,443

UNITED STATES PATENT OFFICE 1,952,443

PRESSURE-REGULATING DEVICE

Robert C. Lamond, Philadelphia, Pa., assignor to American Engineering Company, Philadelphia, Pa., a corporation of Pennsylvania Application April 16, 1932, Serial No. 605,743

2 Claims. (Cl. 103—38)

This invention relates to control means for variable capacity pumps, and the principal object of the invention is to provide a novel device for maintaining constant pressures in fluid systems fed by pumps of this character.

A more specific object of the invention is to provide, in conjunction with the stroke-regulating mechanism of a variable stroke pump, an actuator controlled by pressure in the fluid system of which said pump forms a part whereby a predetermined pressure condition may be automatically maintained in said system.

Still another object of the invention is to provide a control device of the stated character capable of adjustment to regulate the maintained pressure as required.

The invention further resides in certain mechanical details hereinafter set forth and shown in the attached drawing, of which:

Figure 1 illustrates a control system made in accordance with my invention;

Fig. 2 is an enlarged face view of the regulator showing it in a different adjustment from that of Fig. 1, and Fig. 3 is a fragmentary section on the line 3—3, Fig. 2.

With reference to the drawing, 1 is a variable capacity pump which may be, for example, of the positive displacement variable stroke type disclosed in U. S. Patent No. 1,077,979. This pump is actuated in the present instance by an electric motor 2, and supplies fluid pressure to a system represented by the pipes 3 and 4. The pump 1 comprises adjustable means for varying the stroke thereof and thereby the rate of discharge, this means being actuated in the present instance through the medium of a screw 5 which extends into the pump casing and carries at its outer end a worm wheel 6 through the medium of which the said screw may be rotated. The details of the stroke-regulating mechanism are well understood in the art and form no part of the present invention. It is sufficient to state that rotation of the screw 5 in one direction increases the rate of discharge of the pump, and rotation in the opposite direction decreases the rate of discharge.

The worm wheel 6 is actuated through the medium of a worm carried by a shaft 7. This shaft also carries a gear 8 which meshes with a pinion 9 on the shaft 10 of an electric motor 11, this motor being actuated from a suitable source of potential indicated at 12. The motor 11 is of the reversible type, and actuation thereof in the opposite directions may be effected by connecting the source of potential 12 with the leads 13 and 14 respectively.

Operatively connected with the fluid system 3—4 is a pressure gage 15, this gage comprising in the present instance the usual dial 16 and pointer 17, the position of which with respect to said dial indicates the system pressure. Movable with the pointer 17 is a contact element 18 adapted in alternative positions to make contact with terminal segments, 19 and 20, respectively associated with the leads 13 and 14. Normally the element 18 will occupy a position intermediate the terminals 19 and 20, as illustrated in the drawing, in which position the circuit of the motor 11 is broken so that the latter remains inoperative.

In operation, let it be assumed that the pump 1 is withdrawing fluid from the pipe 3 and forcing it into the pipe 4 under a desired normal pressure, as indicated on the dial 16 of the pressure gage. At this normal pressure, the contact element 18 occupies the position shown in Fig. 1. Now, if the pressure in the pipe 4 increases due to a decrease in the requirements of the system, there results a corresponding movement of the pointer 17 of the gage which brings the contact element 18 into engagement, for example, with the segment 19. The motor 11 is thereby actuated to reduce the stroke of the pump 1, this reduction being continued until such time as the pressure in the pipe 4 is reduced to normal, at which time the pointer 17 has returned to its original position carrying with it the contact element 18, which again occupies the neutral position between the terminals 19 and 20, and thereby interrupts operation of the motor 11. If now the demands on the fluid system increase, the resultant decrease of pressure results in an opposite movement of the pointer 17 and brings the element 18 into contact with the terminal 20. This actuates the motor 11 in an opposite direction and increases the stroke of the pump 1, this increase continuing until the pressure in the pipe 4 again reaches the normal, at which time the operation of the motor 11 is again interrupted.

As illustrated in Figs. 2 and 3, the terminal segments 19 and 20 are mounted in a disc 25 which is rotatable about its center to vary the positions of the said segments with respect to the dial 16. This provides for varying or regulating as desired the pressure to be maintained in the system. To permit of this adjustment, the wires 13 and 14 connect respectively to fixed brushes 26 and 27 which are shown as engaging the outer faces of the segments 19 and 20; and the disc 25 is held in adjusted position by studs and wing nuts 28 which pass through arcuate slots 29 in the disc as shown. In Fig. 3 the element 18 is shown contacting the segment 20.

In order to prevent overheating of the motor 11 in the event that the stroke-regulating means is adjusted into an extreme position preventing further rotation of the screw 5, I provide a limit switch 21 mechanically connected with a nut 22 on the screw 5, this nut being slidably confined within a bracket 23 to prevent rotation. The arrangement is such that as the stroke-regulating device approaches the said extreme position, the nut opens the switch and thereby interrupts operation of the motor 11.

The device described above constitutes a simple and effective means for maintaining a desired pressure condition within the fluid system.

I claim:

1. The combination with a fluid system, of a variable stroke pump controlling the pressure of said system, means for regulating the stroke of said pump including a screw shaft, a reversible electric motor for actuating said screw shaft to vary the stroke of said pump, a pressure actuated control switch connected with said system and operative to effect actuation of the motor in opposite directions when the pressure in said system falls below and rises above a predetermined normal respectively, adjustable means in said switch for regulating said normal pressure, a limit switch connected in the circuit to said motor, and means associated with said screw shaft for actuating said switch to interrupt a circuit to said motor when the stroke adjusting mechanism is adjusted to an extreme position.

2. The combination with a fluid system, of a variable stroke pump for controlling the pressure of said system, means for regulating the stroke of said pump including a rotatable screw shaft, a reversible electric motor for actuating said shaft to vary the stroke of said pump, a pressure actuated control switch connected with said system and operative to effect actuation of the motor in opposite directions when the pressure in said system falls below and rises above a predetermined normal respectively, adjustable means in said switch for regulating said normal pressure, a limit switch connected in the circuit of said electric motor, and a traveling nut mounted on said screw shaft and adapted to open said switch when the stroke adjusting mechanism of said pump has been adjusted to an extreme position.

ROBERT C. LAMOND.